United States Patent
Rudy et al.

(10) Patent No.: US 6,941,451 B2
(45) Date of Patent: Sep. 6, 2005

(54) MANAGEMENT SUBSYSTEM AND METHOD FOR DISCOVERING MANAGEMENT DEVICE FUNCTIONS

(75) Inventors: David A. Rudy, Austin, TX (US); Richard E. Mortimer, Consett (GB); Faisal A. Memon, Bracknell (GB); David Tracey, Drogheda (IE); Brian J. Gillespie, Dublin (IE)

(73) Assignee: Sun Microsystems, Inc., Santa Clara, CA (US)

( * ) Notice: Subject to any disclaimer, the term of this patent is extended or adjusted under 35 U.S.C. 154(b) by 581 days.

(21) Appl. No.: 10/193,940

(22) Filed: Jul. 11, 2002

(65) Prior Publication Data

US 2004/0010636 A1 Jan. 15, 2004

(51) Int. Cl.⁷ .............................. G06F 9/00; G06F 3/00
(52) U.S. Cl. .............................. 713/1; 713/2; 710/15; 710/17
(58) Field of Search .................. 713/1; 710/15

(56) References Cited

U.S. PATENT DOCUMENTS

| | | | |
|---|---|---|---|
| 5,724,260 A | * | 3/1998 | Klein .......................... 702/186 |
| 5,819,107 A | * | 10/1998 | Lichtman et al. ............... 710/8 |
| 5,872,931 A | | 2/1999 | Chivaluri |
| 5,958,010 A | * | 9/1999 | Agarwal et al. ............ 709/224 |
| 6,029,155 A | | 2/2000 | Bass et al. |
| 6,539,422 B1 | | 3/2003 | Hunt et al. |
| 6,732,197 B1 | * | 5/2004 | Overy .......................... 710/8 |

OTHER PUBLICATIONS

Sun Microsystems, Inc.; "Sun Fire V120 and Netra 120 Server Architecture"; Technical White Paper, Sun Microsystems, Inc., 2002.

* cited by examiner

*Primary Examiner*—Thuan Du
*Assistant Examiner*—Edward K. Park
(74) *Attorney, Agent, or Firm*—Meyertons Hood Kivlin Kowert & Goetzel, P.C.; B. Noël Kivlin; Stephen J. Curran

(57) ABSTRACT

A management subsystem and method for discovering management device functions. A management subsystem includes a system controller coupled to a plurality of devices each configured to monitor system resources and a non-volatile storage device via a first communication path. The non-volatile storage device may store a plurality of functions associated with the devices. The system controller may access the non-volatile storage device during initialization and create a function list including assigning a unique identifier to each of the functions. The system controller may transmit the function list via a second communication path in response to receiving a request for the function list. Further, the system controller may obtain system management information from one of the devices by invoking a particular one of the functions in response to receiving a request including a particular unique identifier corresponding to the particular one of the functions.

20 Claims, 3 Drawing Sheets

MANAGEMENT SUBSYSTEM AND METHOD FOR DISCOVERING MANAGEMENT DEVICE FUNCTIONS

BACKGROUND OF THE INVENTION

1. Field of the Invention

This invention relates to system hardware detection and, more particularly, to the detection of system components and their features and capabilities.

2. Description of the Related Art

Many computer systems include one or more system management subsystems that may employ components which are coupled to the system management subsystem via some communication path or management bus such as an $I^2C$ bus for example. The components may be general-purpose devices such as general-purpose input/output (GPIO) devices or they may be task specific devices such as temperature measurement devices. In either case, the components may be simple devices with little or no processing power. In addition, the system management subsystem may include a controller that may identify each system management device and may also manage any information retrieved from such a system management device. Further, each component may reside at a fixed location or address on the management bus. Upon system initialization, the controller may access a component and feature set map which is hard-coded into the controller. The component and feature set map may identify each of the system management devices coupled to the management bus.

However since the component and feature set map is hard-coded into a given controller, it may be difficult to interchange controllers from one system to another. In addition, it is possible that a component may be installed that either includes features not in a particular controller's feature set map or the component type is not in the controller's component map. In either case, the controller may not be able to access or control all of the component's features or may not be capable of communicating with that particular component at all.

SUMMARY OF THE INVENTION

Various embodiments of a management subsystem and method for discovering management device functions are disclosed. In one embodiment, a management subsystem includes a system controller, a plurality of devices each configured to monitor system resources and a non-volatile storage device coupled to the plurality of devices via a first communication path. The non-volatile storage device may store a plurality of functions associated with the plurality of devices. The system controller may access the non-volatile storage device during initialization and create a function list including assigning a unique identifier to each one of the plurality of functions. The system controller may transmit the function list via a second communication path in response to receiving a request for the function list via the second communication path. Further, the system controller may obtain system management information from a given one of the plurality of devices by invoking a particular one of the plurality of functions in response to receiving a request including a particular unique identifier corresponding to the particular one of the plurality of functions.

Figure 1:
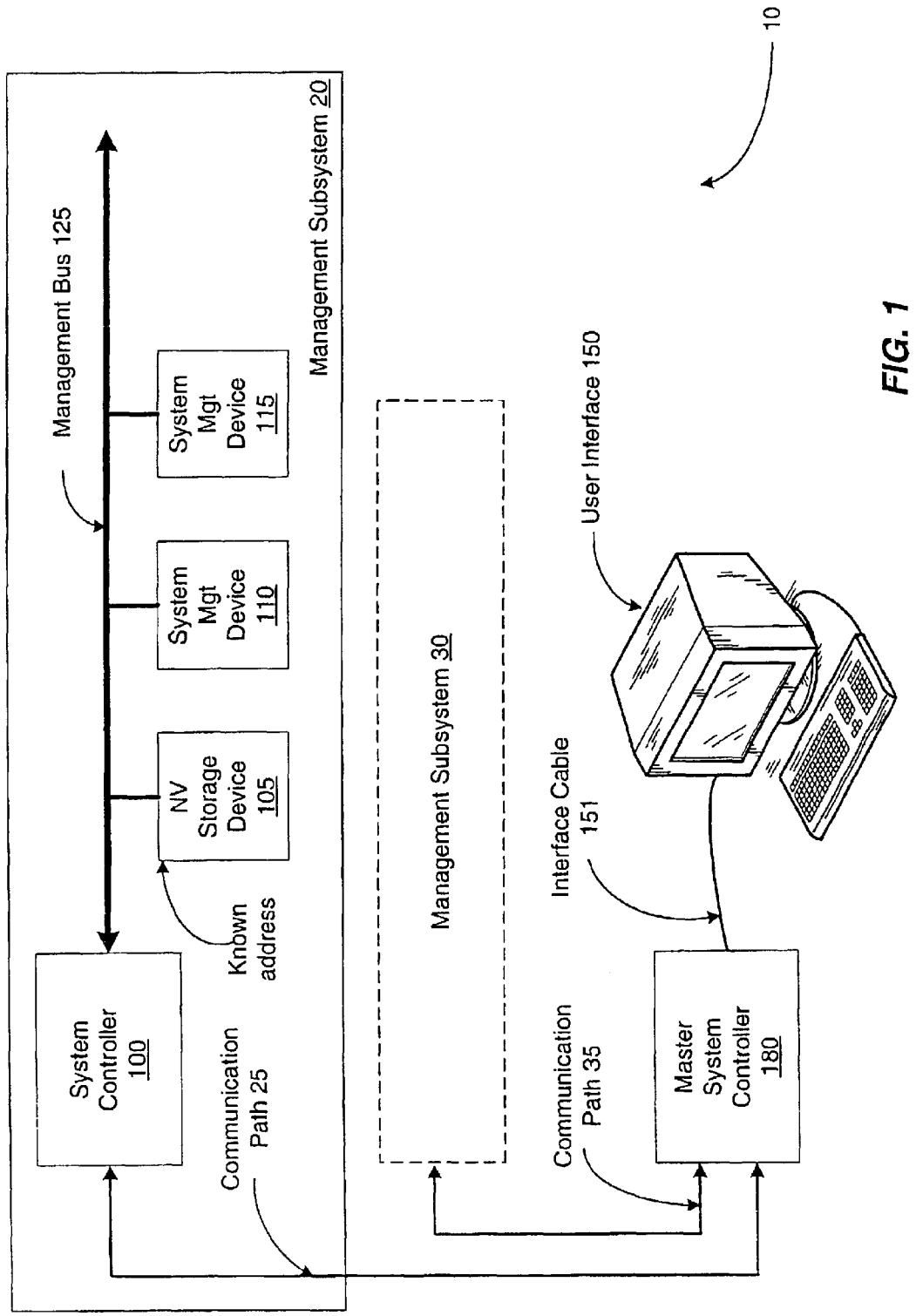
FIG. 1 is a block diagram of one embodiment of a management system including a management subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of a management system including a management subsystem is shown. Management system 10 includes a master system controller 180 coupled to a management subsystem 20 via a communication path 25. Master system controller 180 is also coupled to a management subsystem 30 via a communication path 35. Further, master system controller 180 is coupled to a user interface 150 via interface cable 151. It is noted that although two management subsystems are shown, other embodiments are contemplated that include other numbers of management subsystems.

It is further noted that management system 10 may be employed in a variety of systems. For example, management system 10 may be used in a server system (not shown) to monitor resources and system parameters such as the temperature of a particular component of the server system or the status of the server system power. Management system 10 may also be used to configure or reconfigure those parameters in addition to other parameters. Further, management system 10 may be employed to monitor and configure similar parameters in other types of systems including single and multiprocessor computer systems (not shown).

Management subsystem 20 includes a system controller 100 coupled to a non-volatile storage device 105, a system management device 110 and a system management device 115 via a management bus 125. It is noted that other embodiments are contemplated that include other numbers of system management devices.

Management subsystem 30 may include similar components to management subsystem 20 and may operate in a similar manner. Thus the internal details of management subsystem 30 are not described further.

In one embodiment, communication path 25 and 35 may each be an example of a serial bus. Further to improve system reliability, it is contemplated that communication path 25 and 35 may each be a redundant serial bus. Although it is noted that other embodiments are contemplated that may employ other types of communication paths. For example, in one alternative embodiment, communication path 25 and 35 may each be a wireless communication path. In such an alternative embodiment, management system 10 may employ infrared, radio frequency (rf) or other such wireless communication protocols as desired to provide communication between master system controllers and management subsystems.

Management bus 125 may be an example of any type of shared communication link between two or more devices. For example, in one embodiment, management bus 125 may be an Inter Integrated Circuit (I2C) bus. The I2C bus typically consists of two active wires and a ground connection. The active wires are a serial data (SDA) wire and a serial clock (SCL) wire. Both wires are bi-directional. Generally, any device coupled to an I2C bus may become a master.

Management Subsystem

System controller 100 may be configured to monitor and configure system resources during system operation. System controller 100 may execute software which may enable it to automatically manage system resources. Alternatively, system controller 100 may receive management instructions from master controller 180. System controller 100 may maintain a function list describing each of system management device 110 and 115 and its respective functions. A copy of the function list may be stored internally within system controller 100. As will be described further below, the function list may be transmitted to master controller 180 upon request. System controller 100 may request information from each of system management device 110 and 115 and any other device that may be coupled to management bus 125. System controller 100 may process the requested information and send the information to master controller 180 which may subsequently cause the information to be displayed in one or more formats upon user interface 150.

NV storage device 105 may be any type of non-volatile storage such as an electrically erasable programmable read only memory (EEPROM), for example. Although it is noted that other types of non-volatile storages are contemplated and may be used. In one embodiment, NV storage device 105 is located at a predetermined system address and may be addressable by system controller 100. NV storage device 105 may be used to store management system configuration information including function information corresponding to each device that may be coupled to management bus 125.

System management device 110 and 115 may be examples of temperature measurement devices, general-purpose I/O devices, or other devices. Each device may be a simple device or it may be an intelligent device having processing power. In either case, system controller 100 may communicate with the device via management bus 125. For example, if system management device 110 is a temperature measurement device, system controller 100 may request a temperature reading. In response to such a request, system management device 110 may return the temperature. If system management device 115 is a GPIO device, it may have output pins coupled to external devices such as light emitting diodes (LEDs) (not shown), which may be used to indicate system status information to user.

To enable system controller 100 to be interchangeable and in some cases, hot swappable, system controller 100 may use a standardized functional protocol to communicate with master system controller 180. For example, during system configuration and installation of system management devices 110 and 115, information describing all components coupled to management bus 125 and their respective functions may be preprogrammed and stored within NV storage device 105. Since NV storage device 105 is located at a given address on management bus 125, system controller 100 may access NV storage device 105 at start up to determine which system management devices are present and what functions those devices may perform and at what address each is located. Using this information, system controller 100 may create a function list corresponding to the functions of system management devices 110 and 115. As used herein, the phrase "hot swappable" refers to the ability of a device to be removed and replaced into a system while the system continues to operate in its normal capacity and without reduced functionality.

As described above, a standardized functional protocol may be used by system controller 100 when communicating with master system controller 180. To standardize the protocol, system controller 100 and master system controller 180 may use a common, agreed upon set of functions with which to describe device functionality. Thus, a set of standard functional descriptors is used. Each functional descriptor is a number that corresponds to a given function. The functional descriptors are sometimes referred to as schemas. Therefore each schema has a corresponding function associated with it. For example, schema 200.201 may correspond to a function called "power on" and schema 300.301 may correspond to a function called "reset".

Since system management device 110 and 115 may each have similar functions, they may use the same schemas. Thus to differentiate between functions performed by different devices, system controller 100 assigns a unique identifier (ID) to each function or feature that a given device may perform. In one embodiment, the unique ID may be a four digit hexadecimal number, although other embodiments may use other numbers of digits and other numbering systems. For example, the schema associated with "power on" for system management device 110 and 115 is 200.201. However, the unique ID for the power function of system management device 110 may be #0068h and the unique ID for the power function of system management device 115 may be #0072h, for example. Thus, once system controller 100 determines which devices are available and which functions they may perform, system controller 100 may generate and maintain a function list including a unique ID for each function of each system management device coupled to it. It is contemplated that in other embodiments, the function list may be pre-generated and stored within NV storage device 105. In such embodiments, system controller 100 may access the function list upon start up and store a copy within system controller 100.

The function list may include other information contained in various fields. In one embodiment, the function list may include a Unique ID field, a Data Type field, an Operator field, a Schema field and a Text String field. Table 2 below, illustrates an exemplary partial function list.

Table 1 illustrates an exemplary list of the various data types and operators which may be included in a typical function list. Referring to Table 1, the column entitled Data Type includes some examples of the different data types associated with functions in the function list. The data type for a given function describes the type of data that may be returned or sent with a given command. For example, the function may return Boolean data, which may be True or False and given as a binary 1 or 0, respectively. The function may return a piece of data that is given in a percentage. Further the data type may be Degrees C or Transitory or String. A DegreesC data type may return a value in degrees Celsius. A transitory data type may be self-clearing such that once the command is issued, the value may transition from a current state back to a previous state, for example. An example of a transitory data type may be a Reset function. Typically, a Reset is a function which may be initiated physically by applying a logic zero or a logic one to a circuit for a finite length of time. Thus, the Reset command itself need only be given once and then the command clears itself. A string data type may be an 8-bit character array such as an ASCII character array, for example, that is NUL terminated.

The column within Table 1 entitled Operator includes some examples of the different types of operations a function may perform. For example, an operation may be a read or write. The operation may also be an Async operation. An Async operation may identify a function which returns data that was not necessarily requested. For example, system controller 100 may determine that a power interruption has occurred. It may send an Async function which notifies master system controller 180 that the interruption occurred. The AdRead operator is an addressed read operation. If an AdRead command is sent, the address should follow. Then, the data at that address may be returned in a subsequent response. It is noted that Table 1 is merely an example and is not exhaustive list.

TABLE 1

| Data Type | Operator |
|---|---|
| Percent | Read |
| Boolean | Write |
| Degrees C. | Async |
| Transitory | AdRead |
| String | |

Referring to Table 2 below, the first item in the function list has a unique ID of 0031. The data type of the function is Boolean, meaning that the data may be either True or False. The operator is a read and the schema is 0200.0201. The text string is "/SC/poweron." Likewise, row 2 contains the second item in the function list. It has a unique ID of 001f. The data type of the function is Boolean, meaning that the data may be either True or False. The operator is a write and the schema is 0200.0201. The text string is "/SC/poweron." The third row contains the third item and has a unique ID of 70b2. The data type of the function is Transitory, meaning that the data may be self-clearing. The operator is Async and the schema is 0300.0301. The text string is "/SC/reset." The text string may be used by user interface 150 during display of system management information. In one embodiment, a text string may be instantiated for each function associated with a device that has been assigned a Unique ID.

TABLE 2

Partial Function List

| | Unique ID | Data Type | Operator | Schema | String |
|---|---|---|---|---|---|
| 1 | 0031 | Boolean | r | 0200.0201 | "/SC/poweron/" |
| 2 | 001f | Boolean | w | 0200.0201 | "/SC/poweron/" |
| 3 | 70b2 | Transitory | a | 0300.0301 | "/SC/Reset" |

Once the function list has been established, master system controller 180 may request that system controller 100 send or "publish" the function list. In one embodiment, management subsystem 20 may be a single replaceable unit which may be installed into a system, such as a management system, for example. Upon installation, master system controller 180 may detect the installation and request the function list. In other embodiments, system controller 100 may be installed into the system, at which time master system controller 180 may request the function list. In either case, master system controller 180 may request the function list by issuing low-level commands via communication link 25.

In one embodiment, the low-level command may be issued in the following format, #0xfffe,ffff. The left-most four hexadecimal digits (fffe) represent the command "get function list feature." The right-most four digits (ffff) represent "get the first function in the list." Thereafter, master system controller 180 may request each additional item in the function list by using the "get function list feature" command #0xfffe, and by sending the Unique ID of the last item received. For example, if master system controller 180 requested the function list illustrated in Table 1, the commands would be: #0xfffe,fffe; #0xfffe,0031; #0xfffe,001f. The response to each request by system controller 100 would be to send the corresponding item in the function list. For example, in response to a command of 0xfffe,ffff, system controller 100 may respond with 0x0031010002000201"/SC/poweron." In this example, the 0031 is the Unique ID of the first item, the data type is enumerated as 01, which means Boolean, the Operator is enumerated as 00, which is a read the schema is 02000201 which means the class name and the physical element powered on. The text string "/SC/poweron" identifies the device and function for display. In response to the second request of 0xfffe,0031, system controller 100 may respond with 0x000f010102000201"/SC/poweron." Here, the Operator is 01 which is indicative of a write operation.

Once master system controller 180 has downloaded the function list, it may at any time issue a request of one of the functions in the list. However to make a function request, master system controller 180 need only to use the Unique ID assigned to a given function. This is a "shorthand" way of making requests. For example, if master system controller 180 wants to read the status of the power of system controller 100, master system controller 180 may search the function list for a "poweron" read and gets the shorthand value. Master system controller 180 may simply perform the request using 0x0031. System controller 100 may receive the request and using the function list as a look-up table, it may cause the corresponding function to be executed by a corresponding system management device or the system controller 100 itself. In response to the read, system controller 100 may respond with the shorthand 0x0031010001. This response means the read of system controller power is successful and the status of "poweron" is 0001, or true. If master system controller 180 wants to change the status of the power of system controller 100 by turning power off, it would issue 0x001f00, since the write command is followed by the data value of the write. In response, system controller 100 may reply with 0x001f0100. Again, the reply means the write to system controller power is successful and the status of "poweron" is now 00 or False. Any of the system management information may be displayed upon user interface 150, including the status information returned by system controller 100.

Thus, by using a common agreed upon set of functions and a standard address location for a storage device which may store function information for each device, a system controller may be interchangeable from one system to another, regardless of software versions, number of devices, etc.

It is noted that although the embodiments described above use a particular set of schemas and a particular format to transmit commands and replies, it is contemplated that other schemas may be used to represent functions and other formats may be used to transmit both commands and replies.

Figure 2:
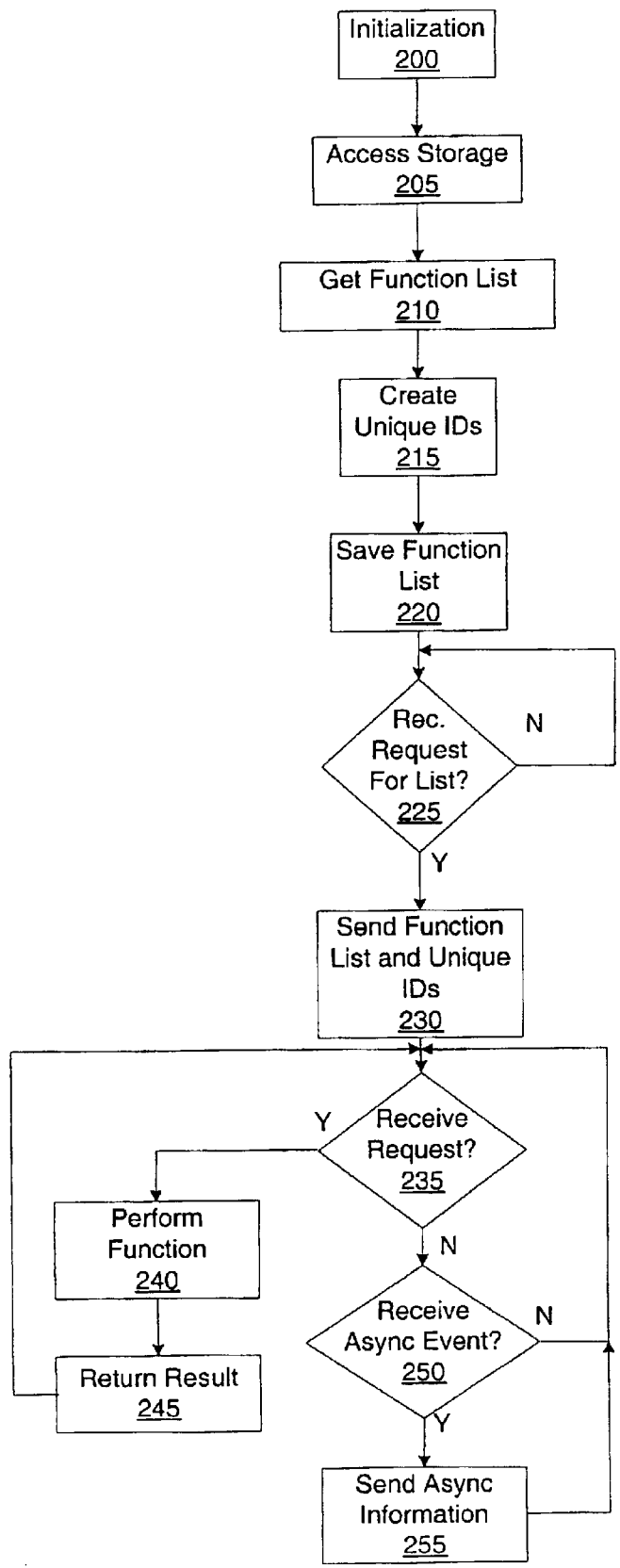
FIG. 2 is a flow diagram describing the operation of one embodiment of a management subsystem.

Referring to FIG. 2, a flow diagram describing the operation of one embodiment of a management subsystem is shown. During start-up of management subsystem 20 of FIG. 1 system controller 100 may initialize itself (block 200). Start-up may be due to normal a power-on sequence or a hot insertion of system controller 100 or management subsystem 20 as described above. System controller 100 accesses NV storage device 105 located at a known address on management bus 125 (block 205). System controller 100 reads a device list from NV storage 105 which may include function and location information about each device coupled to management bus 125 (block 210). System controller 100 creates and assigns a unique ID for each function of each device. Thus a function list is created by system controller 100 which includes a unique feature ID for each function (block 215). A copy of the function list may be cached within system controller 100 (block 220). In an alternative embodiment, the function list may be stored back to NV storage 105.

System controller 100 may now perform functions such as monitoring system events, for example. If a request is received to send the function list (block 225), system controller 100 transmits each item in the function list which is cached within system controller 100 to the requestor (block 230). During operation, system controller may receive a request using the function list shorthand (block 235). Upon receiving a shorthand request system controller may look up the shorthand using the function list that it has cached and then translate the corresponding function into a command (block 240). For example, the command may request a temperature reading in degrees C from system management device 110. Upon receiving the temperature reading result, system controller 100 may transmit a response to the requestor (block 245), using the shorthand encoding as described above in conjunction with the description of FIG. 1.

If system controller 100 does not receive a request (block 235), it may receive unsolicited or asynchronous data from a system management device (block 250). For example, in the event that system management device 115 experiences a power glitch, it may send a notification of that asynchronous event to system controller 100. Thus, system controller 100 may transmit an Async event notification to a device such as master system controller 180 (block 255). If system controller 100 does not receive either a shorthand request (block 235) or an Async event (block 250), system controller 100 may continue to perform functions normally associated with a system controller as it waits for a shorthand request (block 235) or Async event (block 250).

In one embodiment, system controller 100 may be a "smart" controller. For example, instead of waiting for external requests for information or asynchronous data from a system management device, system controller 100 may actively check system management devices 110 and/or 115 for changing conditions. System controller 100 may be programmed to periodically check for changing system conditions. In response to a given condition being detected, system controller 100 may be programmed to report the condition by sending an Async event notification. In some specific embodiments, a smart system controller may take additional actions such as shutting down a device in response to an over-temperature condition, for example.

It is noted that in some embodiments, system controller 100 may transmit Async event notifications that were not included in the function list previously transmitted. These unpublished Async events may be used for history and error tracking purposes since although they may not have corresponding feature IDs in the function list, they may still be saved into a log file for debugging at another time.

Figure 3:
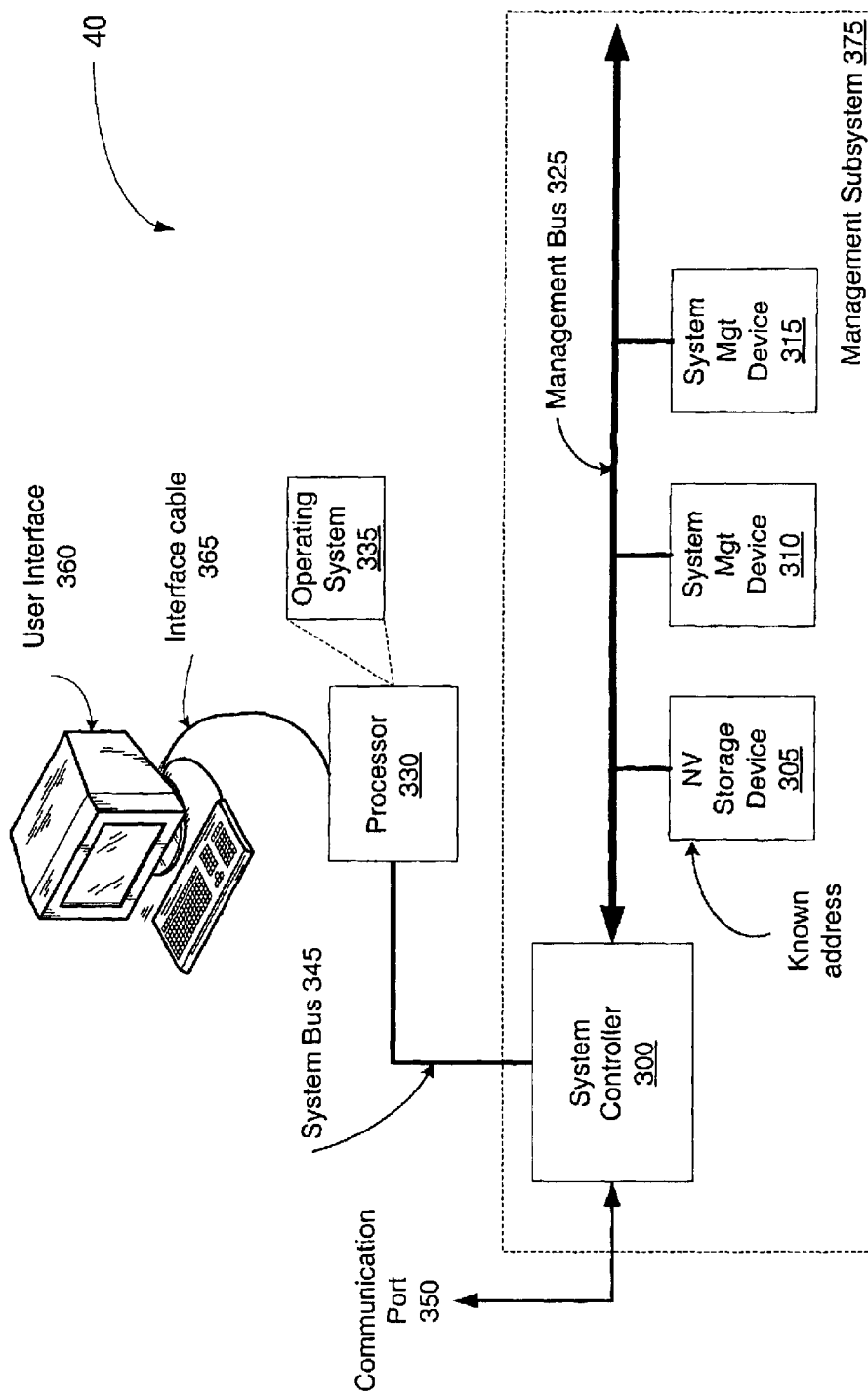
FIG. 3 is a block diagram of one embodiment of computer system including a management subsystem.

Turning to FIG. 3, a block diagram of one embodiment of computer system including a management subsystem is shown. Computer system 40 includes a processor 330 coupled to a management subsystem 375 via a system bus 345 and to a user interface 360 via an interface cable 365. Management subsystem 375 includes a system controller 300 coupled to a non-volatile storage device 305, a system management device 310 and a system management device 315 via a management bus 325. It is noted that other embodiments are contemplated that include other numbers of system management devices.

Management subsystem 375 operates in substantially the same way as management subsystem 20 of FIG. 1. For example, during a start-up or initialization, system controller 300 may access NV storage device 305 to obtain information regarding each of the devices coupled to management bus 325. System controller 300 may further assign Unique IDs to each function of each device. System controller 300 may then create and cache a copy of a function list including the Unique IDs within system controller 300. In an alternative embodiment, system controller 300 may store the function list within NV storage device 305.

Processor 330 is configured to execute instructions such as operating system 335, for example. In one embodiment, operating system 335 may include system management functionality such as the functionality described above in conjunction with the description associated with master system controller 180 of FIG. 1. In such an embodiment, operating system 335 may request system controller 300 to send or "publish" the function list. Operating system 335 may make the request using the protocol described above. In addition, during system operation, operating system 335 may request system management information using the shorthand also described above. Operating system 335 may process the system management information and display the information in one or more formats on user interface 360.

System controller 300 is also coupled to a communication port 350. In one embodiment, communication port 350 is a modem port configured to connect to a telephone interface. Thus, if system controller 300 detects a problem in computer system 40, system controller 300 may be configured to dial a telephone number to request service either automatically or with user intervention via user interface 360. In an alternative embodiment, communication port 350 may be a network connection such as an Ethernet or Infiniband connection, for example. In yet other alternative embodiments, communication port 350 may be a wireless communication port.

It is noted that although a single processor is shown, it is contemplated that computer system 40 may include multiple processors. Further as described above in conjunction with the description of FIG. 1, multiple management subsystems may be used.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A management subsystem comprising:
a plurality of devices each configured to monitor system resources;
a non-volatile storage device coupled to said plurality of devices via a first communication path and configured to store a plurality of functions associated with said plurality of devices; and
a system controller coupled to access said non-volatile storage device during initialization and configured to create a function list including assigning a unique identifier to each one of said plurality of functions;
wherein said system controller is further configured to transmit said function list via a second communication path in response to receiving a request for said function list via said second communication path; and wherein said system controller is further configured to obtain system management information from a given one of said plurality of devices by invoking a particular one of said plurality of functions in response to receiving a request including a particular unique identifier corresponding to said particular one of said plurality of functions.

2. The subsystem as recited in claim 1, wherein said non-volatile storage device is located at a predefined address within a useable range of addresses on said first communication path and each of said plurality of devices is located at a different address within said useable range of addresses.

3. The subsystem as recited in claim 1, wherein said first communication path is compatible with an I2C bus having a bi-directional serial data line, a bi-directional serial clock line and a ground connection, wherein each of said plurality of devices is located at a unique address on said first communication path.

4. The subsystem as recited in claim 1, wherein said plurality of devices includes a temperature measurement device.

5. The subsystem as recited in claim 1, wherein said plurality of devices includes a general-purpose input/output device.

6. The subsystem as recited in claim 1, further comprising a user interface coupled to said system controller and configured to display said system management information.

7. A method of managing a system comprising:
  accessing a plurality of functions associated with a plurality of devices stored within a non-volatile storage device;
  creating a function list including assigning a unique identifier to each one of said plurality of functions;
  transmitting said function list in response to receiving a request for said function list; and
  obtaining system management information from a given one of said plurality of devices by invoking a particular one of said plurality of functions in response to receiving a request including a particular unique identifier corresponding to said particular one of said plurality of functions.

8. The method as recited in claim 7 further comprising locating said non-volatile storage device at a predefined address within a useable range of addresses on a first communication path and locating each of said plurality of devices at a different address within said useable range of addresses.

9. The method as recited in claim 8, wherein said first communication path is compatible with an I2C bus having a bi-directional serial data line, a bi-directional serial clock line and a ground connection, wherein each of said plurality of devices is located at a unique address on said first communication path.

10. A management subsystem comprising:
  means for accessing a plurality of functions associated with a plurality of devices stored within a non-volatile storage device;
  means for creating a function list including assigning a unique identifier to each one of said plurality of functions;
  means for transmitting said function list in response to receiving a request for said function list; and
  means for obtaining system management information from a given one of said plurality of devices by invoking a particular one of said plurality of functions in response to receiving a request including a particular unique identifier corresponding to said particular one of said plurality of functions.

11. A management system comprising:
  a plurality of management subsystems each including:
    a plurality of devices each configured to monitor system resources;
    a non-volatile storage device coupled to said plurality of devices via a first communication path and configured to store a plurality of functions associated with said plurality of devices; and
    a system controller coupled to access said non-volatile storage device during initialization and configured to create a function list including assigning a unique identifier to each one of said plurality of functions;
    wherein said system controller is further configured to transmit said function list via a second communication path in response to receiving a request for said function list via said second communication path; and
    wherein said system controller is further configured to obtain system management information from a given one of said plurality of devices by invoking a particular one of said plurality of functions in response to receiving a request including a particular unique identifier corresponding to said particular one of said plurality of functions;
  a master controller coupled to each of said plurality of management subsystems via a respective second communication path, wherein said master controller is configured to receive said function list from each system controller of said plurality of management subsystems;
  wherein said master controller is further configured to transmit said particular unique identifier corresponding to said particular one of said plurality of functions via said respective second communication path.

12. The management system as recited in claim 11, wherein said non-volatile storage device is located at a predefined address within a useable range of addresses on said first communication path and each of said plurality of devices is located at a different address within said useable range of addresses.

13. The management system as recited in claim 11, wherein said first communication path is compatible with an I2C bus having a bi-directional serial data line, a bi-directional serial clock line and a ground connection, wherein each of said plurality of devices is located at a unique address on said first communication path.

14. The management system as recited in claim 11, wherein said plurality of devices includes a temperature measurement device.

15. The management system as recited in claim 11, wherein said plurality of devices includes a general-purpose input/output device.

16. The management system as recited in claim 11, further comprising a user interface coupled to said master controller and configured to display said system management information.

17. A processing system comprising:
  a processor configured to execute operating system software;
  a management subsystem coupled to said processor via a first communication path said subsystem including:
    a plurality of devices each configured to monitor system resources;
    a non-volatile storage device coupled to said plurality of devices via a second communication path and configured to store a plurality of functions associated with said plurality of devices; and a system controller coupled to access said non-volatile storage device during initialization and configured to create a function list including assigning a unique identifier to each one of said plurality of functions;

wherein said system controller is further configured to transmit said function list via said first communication path in response to receiving a request from said processor for said function list via said first communication path; and wherein said system controller is further configured to obtain system management information from a given one of said plurality of devices by invoking a particular one of said plurality of functions in response to receiving a request including a particular unique identifier corresponding to said particular one of said plurality of functions.

18. The processing system as recited in claim 17, wherein said non-volatile storage device is located at a predefined address within a useable range of addresses on said second communication path and each of said plurality of devices is located at a different address within said useable range of addresses.

19. The processing system as recited in claim 17, wherein said second communication path is compatible with an I2C bus having a bi-directional serial data line, a bi-directional serial clock line and a ground connection, wherein each of said plurality of devices is located at a unique address on said second communication path.

20. The processing system as recited in claim 17 further comprising a user interface coupled to said system controller and configured to display said system management information in one or more formats in response to said operating system obtaining said system management information.

* * * * *